United States Patent [19]

Cocco et al.

[11] Patent Number: 4,996,681
[45] Date of Patent: Feb. 26, 1991

[54] INTEGRAL CARD FOR PROTECTIVELY ENCLOSING AN OPTICAL DISK AND A VISUAL INFORMATION BEARING AREA

[75] Inventors: Vincent L. Cocco, Wakefield; Donald L. Grimes, Milford, both of Mass.

[73] Assignee: Polaroid Corporation, Cambridge, Mass.

[21] Appl. No.: 341,909

[22] Filed: Apr. 24, 1989

[51] Int. Cl.⁵ .................... G11B 3/70; G11B 33/02
[52] U.S. Cl. .................... 369/273; 369/274; 369/292; 369/77.2
[58] Field of Search .......... 369/75.2, 77.2, 273, 369/274, 292; 360/1, 2

[56] References Cited

U.S. PATENT DOCUMENTS

| | | | |
|---|---|---|---|
| 2,225,048 | 12/1940 | Hasin | 369/273 |
| 2,293,301 | 8/1942 | Mitchell | 369/273 X |
| 2,859,974 | 11/1958 | Jauquet | 369/273 X |
| 2,961,922 | 11/1960 | Schwartz et al. | 369/273 X |
| 3,501,586 | 3/1970 | Russell | 178/6.7 |
| 3,857,191 | 12/1974 | Sadorus | 360/2 X |
| 4,138,703 | 2/1979 | Stave et al. | 369/77.2 X |
| 4,213,038 | 7/1980 | Silverman et al. | 235/382 |
| 4,330,350 | 5/1982 | Andrews | 156/152 |
| 4,500,777 | 2/1985 | Drexler | 235/487 |
| 4,660,118 | 4/1987 | Faber | 360/113 |
| 4,663,518 | 5/1987 | Borror et al. | 235/487 |
| 4,692,394 | 9/1987 | Drexler | 369/273 X |
| 4,694,448 | 9/1987 | Tamaru et al. | 369/77.2 X |
| 4,740,949 | 4/1988 | Davis | 369/291 |
| 4,749,081 | 6/1988 | Carlson et al. | 206/309 |
| 4,784,408 | 11/1988 | Yasuda | 369/273 X |
| 4,797,770 | 1/1989 | Takahasi | 369/291 |

FOREIGN PATENT DOCUMENTS

| | | | |
|---|---|---|---|
| 0230069 | 7/1987 | European Pat. Off. | |
| 0079581 | 5/1985 | Japan | 360/2 |
| 0219687 | 11/1985 | Japan | 360/2 |
| 0153889 | 7/1986 | Japan | 360/2 |
| WO86/05620 | 9/1986 | PCT Int'l Appl. | |

OTHER PUBLICATIONS

IBM Technical Disclosure, vol. 18, No. 5, Oct. 1985, pp. 1328–1329, "Shielded Carrier for Encoded Badges", C. T. Waters.

Primary Examiner—William M. Shoop, Jr.
Assistant Examiner—Randy W. Gibson
Attorney, Agent, or Firm—Edward S. Roman

[57] ABSTRACT

An integral data storage disk card includes a planar rectangular base member on a portion of which a data storage disk is disposed for rotation relative to the base member and within an overlaying cover fixed to the base member to protect the data storage disk. A visually discernible information bearing layer in either machine or human readable form is disposed on the other portion of the base member adjacent the data storage disk.

4 Claims, 2 Drawing Sheets

4,996,681

INTEGRAL CARD FOR PROTECTIVELY ENCLOSING AN OPTICAL DISK AND A VISUAL INFORMATION BEARING AREA

BACKGROUND OF THE INVENTION

1. Field of the Invention

This invention relates generally to an integral data storage disk card and, more particularly, to a high density data card comprising both a data storage disk and a visually discernible information bearing area.

2. Description of the Prior Art

Personal data or record cards have found many uses in today's society such as personal identification cards or badges, medical record cards, and financial record cards to name only a few. The uses for such personal data cards are varied and well known in the art and such cards may be made in a variety of sizes and shapes the most familiar of which is the standard wallet size card. Such personal record cards generally include a visually discernible information bearing surface which may be in either machine or human readable form. In human readable form the information may contain a pictorial image of the card holder as well as identifying textual information relating to the card holder's name, address, place of business, etc. In machine readable form the information bearing surface may comprise bar codes, holograms, etc. for security purposes. Further personal data relating to such matters as financial or medical history may also be included on the card on a magnetic and/or optical data storage area as is well known in the art. Recording personal data on an optical storage area allows for a substantially greater volume of personal data to be recorded than is otherwise possible on a magnetic data storage area. However, cards having optical storage areas are vulnerable to scratches and dust occurring on the optical storage area particularly when such cards are frequently carried and handled by the user.

Therefore, it is a primary object of this invention to provide a personal data card that can store data optically without risk of scratches or dust occurring on the optical data storage area despite frequent carrying and handling by the user.

It is a further object of this invention to provide a personal optical data storage card that may be utilized with read/write apparatus of the type designed for use with data storage disks as is well known in the art.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An integral data storage disk card comprises a substantially planar thin rectangular base member. A substantially planar thin rectangular or square cover member coextensively overlies one end portion of a major surface of the base member in fixed connection thereto. The overlying portion of the base member and cover member cooperatively define a substantially thin planar cavity therebetween. A data storage disk having a central hub aperture and a surrounding data storage portion is disposed within the cavity for rotation therein. At least either the cover member or base member includes a hub access aperture therethrough overlying the data disk hub aperture and an elongated data access aperture overlying a radially extending portion of the data storage portion of the data storage disk. A shutter member is disposed for sliding movement with respect to the cover between a first nonoperative position in which the cover overlies the hub access aperture and the data access aperture and a second operative position in which the cover unblocks the hub access aperture and the data access aperture. A visually discernible information bearing layer in either machine or human readable form is disposed in overlying fixed relation to the other end portion of the major surface of the base member.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in conjunction with the accompanying drawings wherein:

DESCRIPTION OF THE PREFERRED EMBODIMENT

Figure 2:
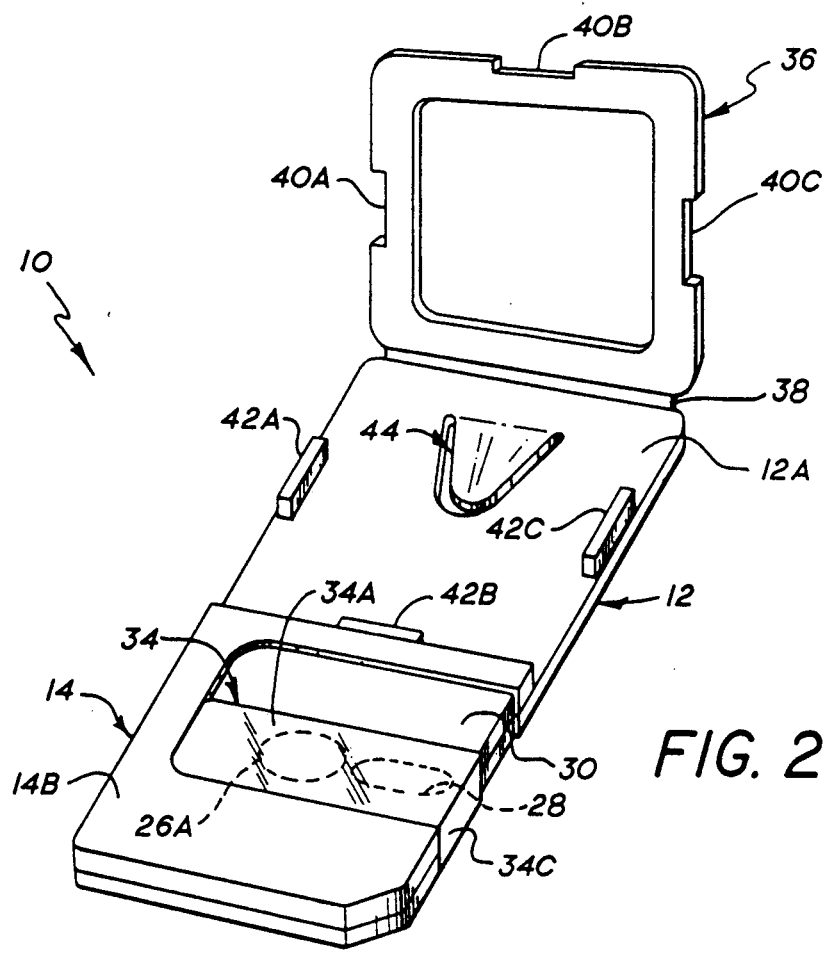
FIG. 2 is a perspective view showing the integral data storage disk card of FIG. 1 in an open position to accommodate receipt of an information bearing layer.
Figure 1:
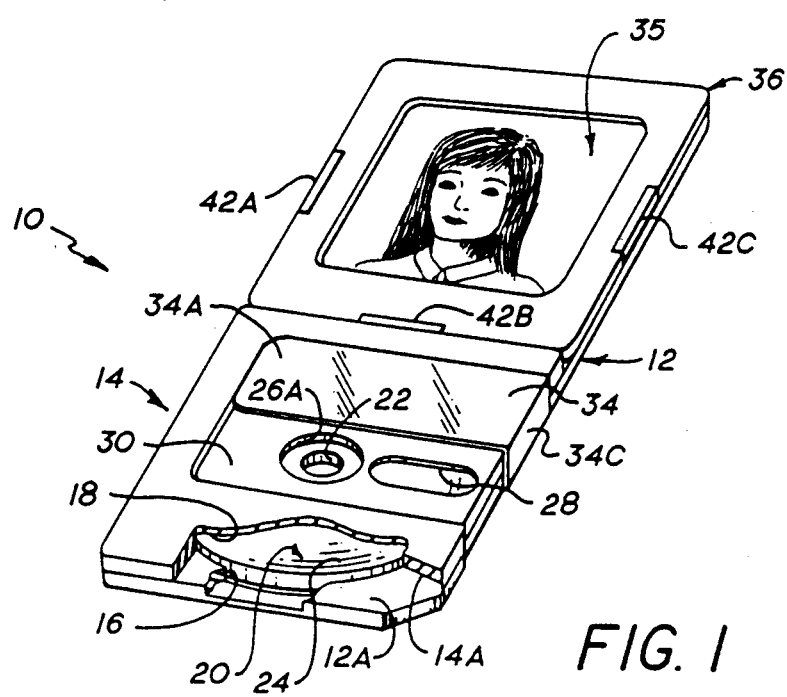
FIG. 1 is a perspective view having selected portions cut away of the integral data storage disk card of this invention.
Figure 3:
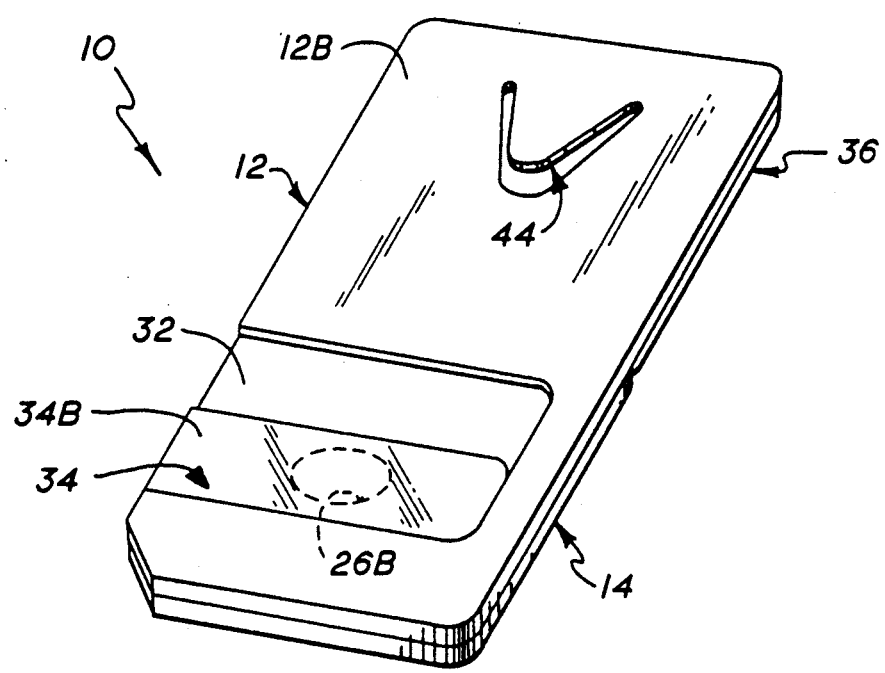
FIG. 3 is a perspective view of a different orientation of the integral data storage disk card of FIG. 1.

Referring to FIGS. 1-3, there is shown the integral data storage disk card of this invention comprising a substantially planar thin rectangular base member 12 having opposed major surfaces 12A and 12B. A substantially planar thin cover member 14 coextensively overlies one end portion of the major surface 12A of the base member 12 in fixed connection thereto. The cover member 14 as shown is substantially square although it will be readily understood that a rectangular shaped cover member could also be utilized so long as it overlays only the end portion of the major surface 12A as shown. The cover member 14 is fixedly connected to the base member 12 by any suitable means such as ultrasonic welding, glue, etc. The cover member 14 also includes opposed major surfaces 14A and 14B as shown. The major surface 14A of the cover member 14 includes a recessed portion 18 which is complementary to a recessed portion 16 in the major surface 12A of the base member 12 and which collectively define a thin planar cavity within which is disposed a data storage disk 20 for rotation therein in a well-known manner. The data disk 20 includes a central hub aperture 22 and a concentric data storage portion 24 surrounding the hub aperture 22 and on which may be recorded machine readable binary data in a well-known manner.

The cover member 14 includes a recessed flat area as shown at 30 through which there is provided a hub access aperture 26A and an elongated data access aperture 28 overlying a radially extending area of the concentric data storage portion 24. The base member 12 also includes a recessed flat area 32 (FIG. 3) in registration with the recessed flat area 30 of the cover 14. A second hub access aperture 26B may also be provided through the recessed flat area 32 in alignment with the central hub aperture 22 of data disk 20.

A shutter member 34 comprises a first planar cover member 34A disposed in overlying relation with respect to the flat area 30, a second planar cover member 34B disposed in overlying relationship with respect to the recessed flat area 32 (FIG. 3) and an interconnecting planar wall member 34C. As will be readily understood, the shutter member 34 may comprise a single thin sheet of metal bent along the respective edge lines to form the opposed cover members 34A and 34B and the interconnecting member 34C. The shutter member 34 may be slidingly moved within the confines of the recessed flat areas 30 and 32 between a first nonoperative position in which the cover members 34A, 34B overlie, respectively, hub access apertures 26A, 26B (FIG. 2). In addition, as is readily apparent, the cover member 34B also overlies the elongated data aperture 28. As is readily understood, insertion of the integral data storage disk card into an appropriate write and/or read apparatus operates to automatically slide the shutter member 34 from its inoperative position to an operative position (FIG. 1) in which the hub access apertures 26A and 26B are uncovered by the cover members 34A and 34B, respectively. In addition, as is readily apparent, the elongated data access aperture 28 is also uncovered from sliding movement of the cover member 34A to its operative position.

The other end portion of the major surface 12A of the base member 12 not overlayed by the cover member 14 is provided with a visually discernible information bearing layer 35 which may be in either machine or human readable form. The information bearing layer may thus comprise an image or photograph of a person to whom the card identifies and for whom further data relating to either the card holder's medical, financial, etc. condition are stored on the data storage disk 20. In addition to an image of the card holder, the information bearing layer 35 may also comprise textual information identifying the card holder's name, address, place of employment, etc. Machine readable information such as bar graphs, holograms, etc. may also be included on the information bearing layer 35 for purposes of security as is well known in the art. Information bearing layer 35 may be attached to the major surface 12A by any suitable adhesive or glue. Surrounding the information layer 35 there may be provided a raised frame 36 that may be integrally molded to the base member 12.

In one preferred embodiment as shown in FIG. 3, the frame 36 may be pivotally connected with respect to the base member 12 for movement between an open position as shown in which the frame 36 is spaced apart from the major surface 12A to accommodate the unobstructed placement of the information bearing layer 35 in overlying relation to the major surface 12A and a closed position in which the frame 36 overlies the periphery of the information bearing layer 35 so as to hold it in fixed overlying position with respect to the major surface 12A of the base member 12. As will be readily understood, the frame 36 may be pivotally connected to the base member 12 by an integrally molded hinge as shown at 38. When the frame 36 is pivoted into its closed position, it may be releasably latched to the base member 12 by the engagement of a plurality of peripheral notches as shown at 40A, 40B and 40C with respective projecting detents 42A, 42B and 42C. Thus, in this manner may the frame 36 be subsequently opened to accommodate replacement and updating of the information bearing layer 35. Other well known means such as a slot in the edge of the frame 35 may also be provided to accommodate the ready insertion and removal of different information bearing layers.

Referring to FIGS. 2 and 3, there is shown at 44 an integrally molded clip portion cantilevered from the major surface 12B of the base member 12. As is readily apparent, the clip 44 can be utilized to connect the integral data storage disk card 10 of this invention to the breast pocket of a suit or shirt so that it can be worn as an identification badge. As will be readily understood, the base member 12, cover member 14 and frame 36 may all be injection molded from well-known plastics such as styrene, Cycalax, etc. The integral data storage disk card 10 of this invention may be utilized for any variety of applications such as an identification and/or security badge, a medical and/or financial record card, etc.

Other embodiments of the invention including additions, subtractions, deletions and other modifications of the preferred disclosed embodiments of the invention will be obvious to those skilled in the art and are within the scope of the following claims.

What is claimed is:

1. An integral data storage disk card comprising:

a substantially planar thin rectangular base member;

a substantially planar thin rectangular or square cover member coextensively overlying one end portion of a major surface of said base member in fixed connection thereto, said overlying portions of said base member and said cover member cooperatively defining a substantially flat thin cavity therebetween;

an optical data storage disk disposed within said cavity for rotation therein, said disk having a central hub aperture and a surrounding data storage portion, said cover or base member including a hub access aperture therethrough overlying said data disk hub aperture and an elongated data access aperture overlying a radially extending part of said data storage portion;

a shutter member disposed for sliding movement with respect to said cover and base members between a first nonoperative position in which said cover overlies said hub access aperture and said data access aperture and a second operative position in which said cover unblocks said hub access aperture and said data access aperture; and a visually discernible information bearing layer in machine or human readable form disposed in overlying fixed relation to the other end portion of said major surface of said base member wherein said other end portion of said major surface of said base member includes an integral frame coextensive with the periphery thereof for framing said information bearing layer, said frame being pivotally connected with respect to one edge of said other end portion of said major surface of said base member for movement between an open position in which said frame is spaced apart from said other end portion of said major surface of said base member to accommodate the unobstructed placement of said information bearing layer in overlying relation to said other end portion of said major surface of said base member and a closed position in which said frame overlies the periphery of said information bearing layer so as to hold said information bearing layer in fixed overlying position with respect to said other end portion of said major surface of said base member.

2. The integral data storage disk card of claim 1 wherein said base member, said cover member and said frame are molded plastic and said frame is pivotally connected to said base member by an integrally molded plastic hinge.

3. The integral data storage disk of claim 1 further comprising integral releasable latch means for releasably latching said frame to said base member when said frame is pivoted into said closed position.

4. The integral data storage disk card of claim 1 wherein said other end portion of said major surface of said base member includes an integrally molded clip portion.

* * * * *